US010736456B2

(12) United States Patent
Junfola

(10) Patent No.: US 10,736,456 B2
(45) Date of Patent: Aug. 11, 2020

(54) VERSATILE KITCHEN RICER

(71) Applicant: UBERCHEF (GA) LLC, Alpharetta, GA (US)

(72) Inventor: Joseph Junfola, Buffalo, WY (US)

(73) Assignee: Uber Chef (GA) LLC, Alpharetta, GA (US)

(*) Notice: Subject to any disclaimer, the term of this patent is extended or adjusted under 35 U.S.C. 154(b) by 287 days.

(21) Appl. No.: 15/864,867

(22) Filed: Jan. 8, 2018

(65) Prior Publication Data

US 2019/0208944 A1 Jul. 11, 2019

(51) Int. Cl.
| | | |
|---|---|---|
| *A47J 19/04* | (2006.01) | |
| *B30B 9/02* | (2006.01) | |
| *A47J 19/00* | (2006.01) | |
| *B30B 9/04* | (2006.01) | |
| *B30B 9/06* | (2006.01) | |

(52) U.S. Cl.
CPC ............ *A47J 19/04* (2013.01); *A47J 19/005* (2013.01); *B30B 9/02* (2013.01); *B30B 9/04* (2013.01); *B30B 9/06* (2013.01)

(58) Field of Classification Search
CPC .. B30B 9/04; B30B 9/06; B30B 15/08; B30B 9/02; A47J 19/02; A47J 19/022; A47J 19/04; A47J 19/06; A47J 19/005; A47J 2043/04481; A47J 2043/0449; A47J 43/286; A47J 44/00; A47J 43/04; A23N 1/00; A23N 1/02; A23L 2/04
USPC ............... 100/110, 112, 125, 213, 234, 243; 99/495, 501, 503, 506, 508, 513, 565
See application file for complete search history.

(56) References Cited

U.S. PATENT DOCUMENTS

| | | | | |
|---|---|---|---|---|
| 1,734,265 A | * | 11/1929 | Mitcham | A47J 19/02 100/98 R |
| 1,885,873 A | * | 11/1932 | Stein | A47J 19/005 241/84.4 |
| 3,642,045 A | | 2/1972 | Jacques | |
| 4,348,950 A | | 9/1982 | Harris | |
| 4,674,404 A | * | 6/1987 | D'Erasmo | A47J 43/28 100/234 |
| 6,196,122 B1 | * | 3/2001 | Lai | A47J 19/06 99/495 |

(Continued)

*Primary Examiner* — Jimmy T Nguyen
(74) *Attorney, Agent, or Firm* — Taylor English Duma LLP

(57) ABSTRACT

A manual food ricer tool includes a lower body assembly, one or a plurality of lower handles or grips connected to the body assembly, a strainer with interchangeable and replaceable screen inserts and a handle connected to the sleeve insert that is pivotally disposable into the body assembly, a pressure applying pusher plate disposed on the upper handle assembly that is pivotably attached to the lower body assembly and displaceable into the sleeve insert, the upper handle assembly pivotably connected to the pusher plate and the body assembly. The upper and lower handles and grips feature ergonomic inserts for easier handling and operation, while the replaceable screen inserts provide convenience in selecting ricer patterns as well as faster switching between ricer patterns during use, and easier disassembly and cleaning of the ricer tool during and after usage. The manual food ricer tool offers reduced expense, easier convenience in use and cleaning, reduced discomfort and fatigue and reduced likelihood of repetitive motion injury with prolonged usage.

20 Claims, 8 Drawing Sheets

(56) References Cited

U.S. PATENT DOCUMENTS

| | | | |
|---|---|---|---|
| 7,117,785 B2 | 10/2006 | Walker | |
| 7,293,502 B2 | 11/2007 | So | |
| 7,296,762 B2 | 11/2007 | Dorion | |
| 7,299,747 B2 * | 11/2007 | So | A47J 19/005 100/110 |
| 7,635,101 B1 | 12/2009 | Man et al. | |
| 8,322,277 B2 * | 12/2012 | Griffith | A47J 19/005 100/234 |
| 8,490,906 B2 * | 7/2013 | Connelly | A47J 19/04 100/110 |
| 9,044,046 B2 | 6/2015 | Jalet | |
| D860,726 S * | 9/2019 | Tsai | D7/409 |
| 2009/0078131 A1 * | 3/2009 | So | A47J 19/06 100/234 |
| 2009/0271951 A1 * | 11/2009 | Hao | B25G 1/102 16/430 |

* cited by examiner

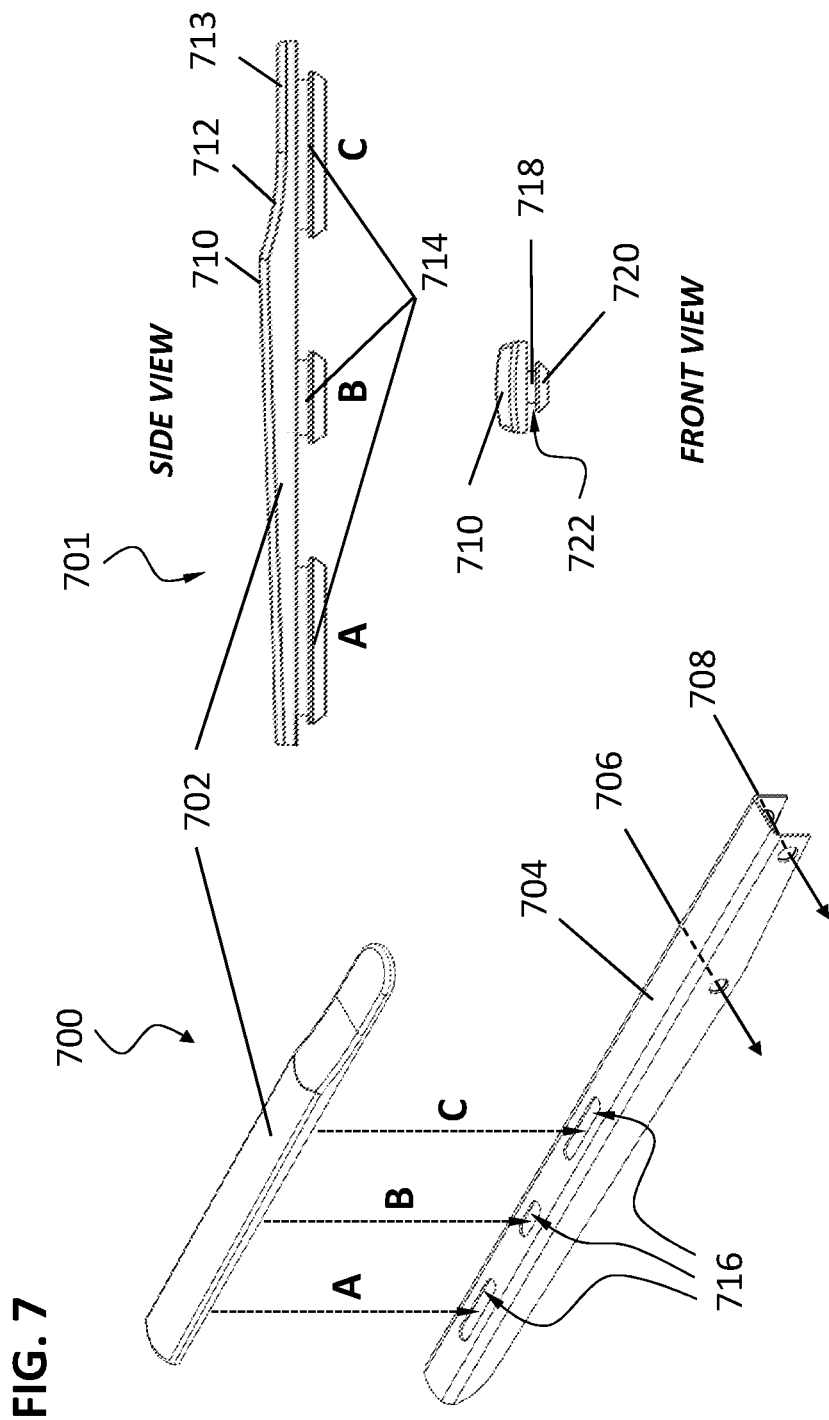

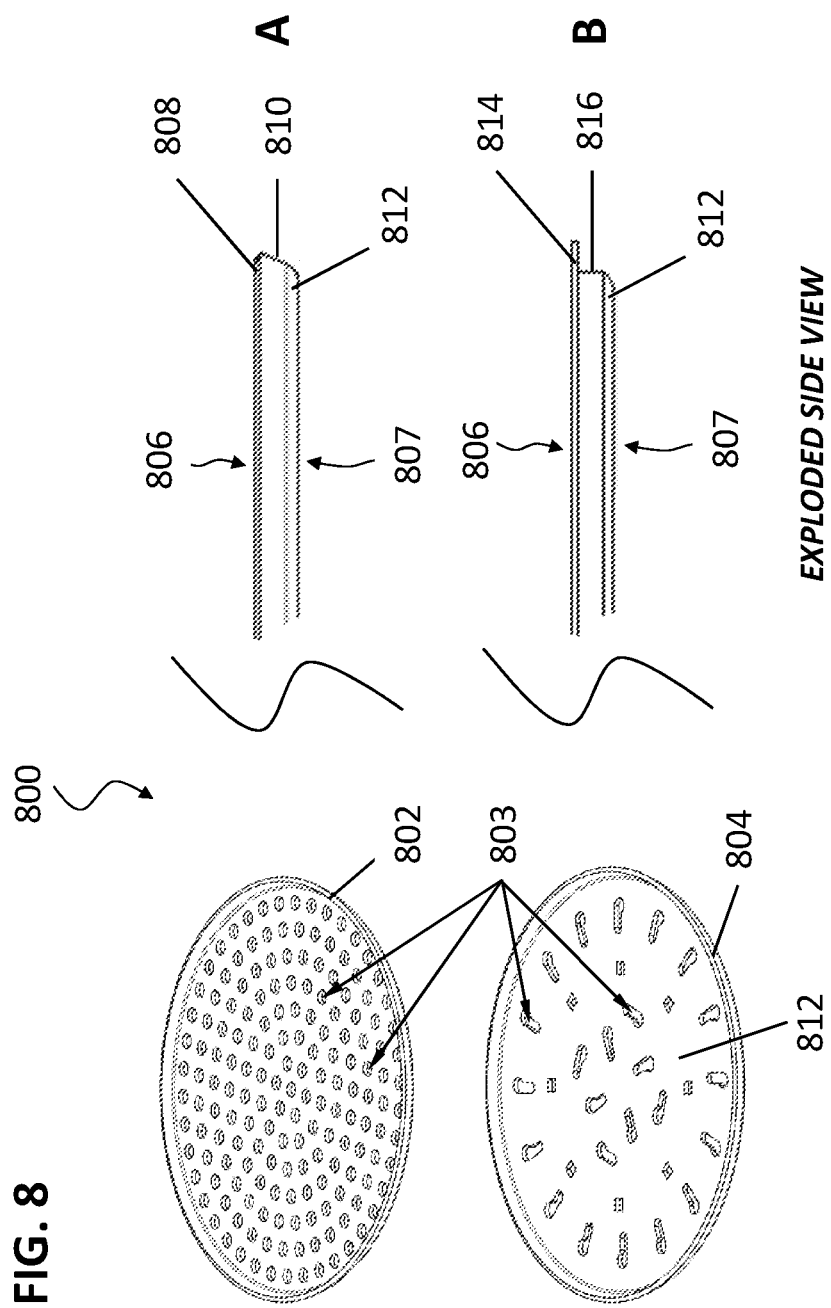

VERSATILE KITCHEN RICER

BACKGROUND

The present invention relates generally to a manual food ricer tool that features an integrated strainer assembly with interchangeable and replaceable screen inserts that provide convenience to a user in cleaning and operating the tool, as well as convenience of choice of ricer patterns for the processing of food stuffs using a single tool. The present invention also relates to an ergonomically improved manual food ricer tool that provides the user with improved ease of use and smoother operation to prevent discomfort and repetitive motion injury with prolonged or repeated usage.

Various manual food ricer tools are known in the art and are a popular tool to have in and around the kitchen for the processing of food stuffs by compressing them through a screen or grid or similar means enabling the straining or extrusion of the material to be either juiced for extraction or extruded into a cross-sectional pattern corresponding to the screen or grid pattern. al, the existing ricer tools generally feature a strainer basket with an integrally incorporated screen in that offers only a single grid pattern and corresponding extrudate, requiring the cost and inconvenience of purchasing and using additional ricer tools. Further, the existing ricer tools with strainer baskets retain food material and are harder to clean between and after uses.

Further, existing manual food ricer tools are equipped with handles that are manipulated to maneuver a pressure or pusher plate to compress the food stuff and force it through the screen or grid to produce riced material, a process typically requiring some degree of manual force applied by the user, usually employing a single hand for the operation to compress the food stuff. With denser food stuff is used, or the food stuff is selected for juicing or extraction of liquids without an extrudate, very high manual compression forces need to be applied, raising the concern of discomfort and repetitive motion injuries with repeated and prolonged usage.

Accordingly there is a need for an improved food ricer tool that offers a user choice of ricer patterns at reduced expense and easier convenience, as well as an ergonomically improved handle and compression assembly that is easier to use and offers reduced discomfort and fatigue and reduces the likelihood of repetitive motion injury.

SUMMARY

Disclosed herein is an inventive ricer tool featuring an improved system for accommodating a selection of easily replaceable screen inserts with differing ricer patterns for the convenient processing of food stuffs and materials.

One aspect of the present invention is a ricer tool having: (a) a lower body assembly in the form of a first straight cylinder having a first opening located on the top end and a second opening located on the bottom end of said first cylinder; (b) a strainer assembly in the form of a second straight cylinder having a third opening with a circumferential internal flange located at the distal end of said second cylinder and a fourth opening with a circumferential external flange located at the proximate end of said second cylinder; at least one or a plurality of screen inserts; wherein said screen inserts are interchangeable with one another; wherein said screen insert has a circumferential flange located around its outer perimeter; wherein said fourth opening of said strainer assembly are receptive to receive said screen inserts; wherein said circumferential flange of said screen insert engages with said internal flange of said strainer assembly when said screen insert is further advanced into position adjacent to said third opening at said distal end of said strainer assembly and contacts said internal flange of said strainer assembly; (c) a pusher plate; wherein a proximate face of said pusher plate is connected to a proximate end of a pusher rod whose distal end is hingedly connected to a first pivoting junction on a pivoting handle; wherein said pivoting handle has a second pivoting junction connected to a third pivoting junction located on an outer cylinder wall of said lower body assembly; wherein said pivoting handle pivots about said second and third pivoting junction and said distal end of said pusher rod pivots about said first pivoting junction to bring said pusher rod and said pusher plate into said proximate forth opening of said strainer assembly and to move the distal face of said pusher plate in the direction of said distal third opening of said strainer assembly; wherein the positions of said first, second and third pivoting junctions are selected to enable said pivoting handle to reversibly move said pusher plate into a position immediately adjacent said fourth opening of said strainer assembly and reversibly move said distal face of said pusher plate into contact with said screen insert located at said proximate third opening of said strainer assembly.

Another aspect of the present invention is a ricer tool wherein said circumferential flange of said screen insert has a shape selected from a beveled edge, tapered edge, rimmed edge, and combinations thereof; and wherein said circumferential internal flange located at said distal end of said strainer assembly has a shape complementary to said shape of said circumferential flange of said screen insert.

Yet another aspect of the present invention is a ricer tool wherein said screen inserts have a plurality of cutouts in the form of bores, holes, openings, perforations, punch-outs and combinations thereof; wherein the shapes of said cutouts include circles, squares, rectangles, and other geometric shapes, swiggles, tear-drops, and the like, and combinations thereof.

A further aspect of the present invention is a ricer tool wherein the outer diameter of said circumferential flange of said screen insert is smaller than the inner diameter of said first opening in said lower assembly; wherein the outer diameter of said circumferential flange is larger than the inner diameter of said internal flange of said strainer assembly; and wherein said circumferential flange of said strainer assembly mates with said internal flange of to stabilize its position at said proximate third opening of said strainer assembly.

Yet another aspect of the present invention is a ricer tool wherein said first straight cylinder of said lower body assembly and said second straight cylinder of said strainer assembly have circular cross-sections.

A further aspect of the present invention is a ricer tool wherein said lower body assembly has one or a plurality of lower handles connected to an outer cylindrical wall thereof.

Another aspect of the present invention is a ricer tool wherein a first lower handle is fixedly attached at a first position on the top end of said lower body assembly in a perpendicular orientation with respect to a normal axis coincident to the plane of the surface of said outer wall.

Yet a further aspect of the present invention is a ricer tool wherein at least a second of said lower handles is pivotably attached to said lower body assembly by means of said second pivoting junction connected with said third pivoting junction by a pivoting means having a first pivoting axis; wherein said third pivoting junction is fixedly attached at the top end of said lower body assembly at a position directly opposite said first position of said first lower handle.

One additional aspect of the present invention is a ricer tool wherein said second lower handle pivots about said first pivoting axis; wherein said second lower handle can pivot 1800 about said first pivoting axis from a first open position to a second closed position wherein said second lower handle is brought into an approximately parallel configuration with respect to the orientation of said first fixedly attached lower handle.

Another aspect of the present invention is a ricer tool wherein said first pivoting junction on said second lower handle and said distal pivoting junction on said pusher rod pivots about said second pivoting junction having a second pivoting axis; wherein said pusher rod and attached pusher plate move in alignment with the center axis of said straight cylinder of said strainer assembly when said second lower handle pivots about said first pivoting axis.

Yet a further aspect of the present invention is a ricer tool wherein said distal end of said pusher rod is pivotably connected to said second lower handle at a first pivoting axis located at said first pivoting junction that is a distance equivalent to one half the inner diameter of the cylinder of said lower body assembly with respect to said second pivoting axis located at said second and third pivoting junction so that when said second lower handle is pivoted about said second pivoting axis, the first pivoting axis remains aligned with said center axis of both straight cylinders of said strainer assembly and said lower body assembly.

One other aspect of the present invention is a ricer tool wherein said first and second lower handles feature one or a plurality of ergonomic surfaces on their respective hand engagement sides; wherein said ergonomic surfaces are inserts attached to the hand engaging surfaces of said first and second lower handles; and wherein said inserts are constructed of an ergonomic material selected from a copolymer, elastomer, latex, polymer, resin, rubber, silicone, and combinations thereof. An aspect of the present invention is a ricer tool wherein said lower body assembly features at least one thumb handle assembly that is located on said lower body assembly and optionally, located immediately opposite said first lower handle and adjacent to said second lower handle at a position on the outer cylinder of said lower body immediately below said third pivoting junction.

Yet another aspect of the present invention is a ricer tool wherein said thumb handle assembly includes an ergonomic material selected from a copolymer, elastomer, latex, polymer, resin, rubber, silicone, and combinations thereof.

A further aspect of the present invention is a ricer tool having (a) a lower body assembly in the form of a first straight cylinder having a first opening located on the top end and a second opening located on the bottom end of said first cylinder; (b) a strainer assembly in the form of a second straight cylinder having a third opening with a circumferential internal flange located at the distal end of said second cylinder and a fourth opening with a circumferential external flange located at the proximate end of said second cylinder; (c) at least one or a plurality of screen inserts; wherein said screen inserts are interchangeable with one another; wherein said screen insert has a circumferential flange located around its outer perimeter; wherein said fourth opening of said strainer assembly are receptive to receive said screen inserts; wherein said circumferential flange of said screen insert engages with said internal flange of said strainer assembly when said screen insert is further advanced into position adjacent to said third opening at said distal end of said strainer assembly and contacts said internal flange of said strainer assembly; wherein said circumferential flange of said screen insert has a shape selected from a beveled edge, tapered edge, rimmed edge, and combinations thereof and wherein said circumferential internal flange located at said distal end of said strainer assembly has a shape complementary to said shape of said circumferential flange of said screen insert; wherein said screen inserts have a plurality of cutouts in the form of bores, holes, openings, perforations, punch-outs and combinations thereof; wherein the shapes of said cutouts include circles, squares, rectangles, and other geometric shapes, swiggles, tear-drops, and the like, and combinations thereof; (d) a pusher plate; wherein a proximate face of said pusher plate is connected to a proximate end of a pusher rod whose distal end is hingedly connected to a first pivoting junction on a pivoting handle; wherein said pivoting handle has a second pivoting junction connected to a third pivoting junction located on an outer cylinder wall of said lower body assembly; wherein said pivoting handle pivots about said second and third pivoting junction and said distal end of said pusher rod pivots about said first pivoting junction to bring said pusher rod and said pusher plate into said proximate forth opening of said strainer assembly and to move the distal face of said pusher plate in the direction of said distal third opening of said strainer assembly; wherein the positions of said first, second and third pivoting junctions are selected to enable said pivoting handle to reversibly move said pusher plate into a position immediately adjacent said fourth opening of said strainer assembly and reversibly move said distal face of said pusher plate into contact with said screen insert located at said proximate third opening of said strainer assembly; wherein said lower body assembly has one or a plurality of lower handles connected to an outer cylindrical wall thereof; wherein a first lower handle is fixedly attached at a first position on the top end of said lower body assembly in a perpendicular orientation with respect to a normal axis coincident to the plane of the surface of said outer wall; wherein at least a second of said lower handles is pivotably attached to said lower body assembly by means of said second pivoting junction connected with said third pivoting junction by a pivoting means having a first pivoting axis; wherein said third pivoting junction is fixedly attached at the top end of said lower body assembly at a position directly opposite said first position of said first lower handle; wherein said second lower handle pivots about said first pivoting axis; wherein said second lower handle can pivot 180° about said first pivoting axis from a first open position to a second closed position; wherein said second lower handle is brought into an approximately parallel configuration with respect to the orientation of said first fixedly attached lower handle; wherein said first pivoting junction on said second lower handle and said distal pivoting junction on said pusher rod pivots about said second pivoting junction having a second pivoting axis; wherein said pusher rod and attached pusher plate move in alignment with the center axis of said straight cylinder of said strainer assembly when said second lower handle pivots about said first pivoting axis; and wherein said distal end of said pusher rod is pivotably connected to said second lower handle at a first pivoting axis located at said first pivoting junction that is a distance equivalent to one half the inner diameter of the cylinder of said lower body assembly with respect to said second pivoting axis located at said second and third pivoting junction so that when said second lower handle is pivoted about said second pivoting axis, the first pivoting axis remains aligned with said center axis of both straight cylinders of said strainer assembly and said lower body assembly.

Another aspect of the present invention is a ricer tool wherein said first and second lower handles feature one or a plurality of ergonomic surfaces on their respective hand engagement sides; wherein said ergonomic surfaces are inserts attached to the hand engaging surfaces of said first and second lower handles; and wherein said inserts are constructed of an ergonomic material selected from a copolymer, elastomer, latex, polymer, resin, rubber, silicone, and combinations thereof.

Yet another aspect of the present invention is a ricer tool wherein said lower body assembly features at least one thumb handle assembly that is located immediately opposite said first lower handle and adjacent to said second lower handle at a position on the outer cylinder of said lower body immediately below said third pivoting junction; wherein said thumb handle assembly includes an ergonomic material selected from a copolymer, elastomer, latex, polymer, resin, rubber, silicone, and combinations thereof.

BRIEF DESCRIPTION OF THE DRAWINGS

FIG. 7 shows a detailed view of one embodiment of a kitchen ricer tool's handle and ergonomic pad inserts.

FIG. 8 shows a detailed view of one embodiment of a kitchen ricer tool's screens with various hole patterns and perimeter style engagement profiles for coupling to the sleeve cylinder assembly.

Figure 1:
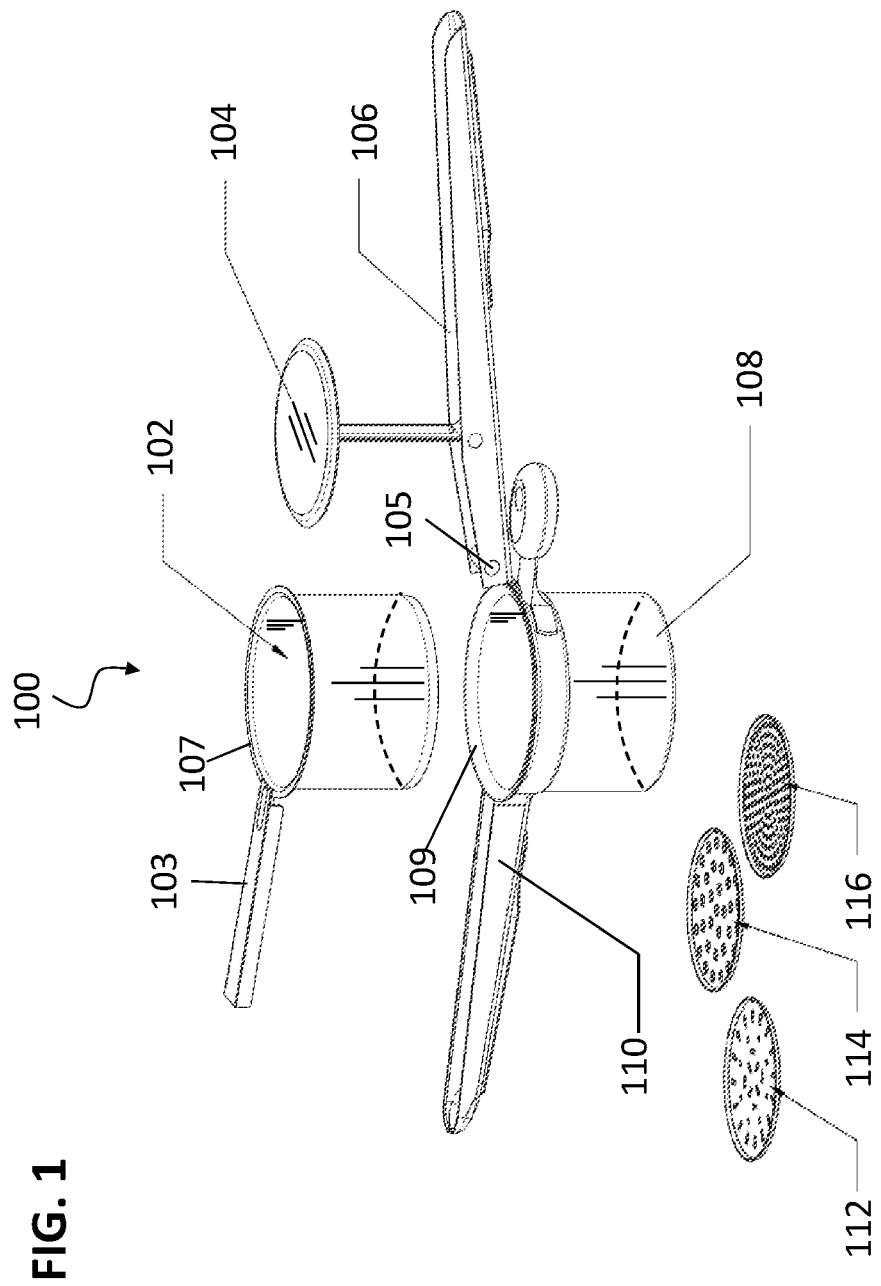
FIG. 1 shows a compound view of one embodiment of a kitchen ricertool featuring a removal press sleeve with screens and articulating plunger with handle.

A corresponding Figure Key detailing the specific component parts, configurations and means of operation of the inventive tool is provided in an Appendix attached hereinbelow and accompanying this specification.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

The terms "screen", "grid", "perforate" and "perforated body" are meant to refer to, and include, a pattern of one or a plurality of openings in an otherwise solid material such as a sheet, plane, disc, or body of a solid material through which a liquid or non-liquid material can be pressed.

The term "opening" is meant to include an open space or cavity, as well as a hole, bore, cutout, gap, spacing or passage through an otherwise solid material, or a woven material such as a knit, fabric, mesh, screen, or the like composed of a plurality of filaments, threads, wires, and the like, which form a partially open structure with one or more openings through at least one cross-sectional diameter of such solid or assembly of such woven material.

The terms "ricer" and the product of a ricer operation, referred to as being "riced", and the process of "ricing" are meant to include the operations of compressing, liquifying, squeezing, decanting, extracting, pressing, and the like in reference to subjecting a food material or other matter to a compressive force.

DETAILED DESCRIPTION

Various embodiments of the present invention relating to a novel kitchen ricer tool featuring easily removable and easier cleaning screen inserts and assemblies are detailed below with respect to the included figures which show non-limiting examples of the inventive tool.

Figure 5:
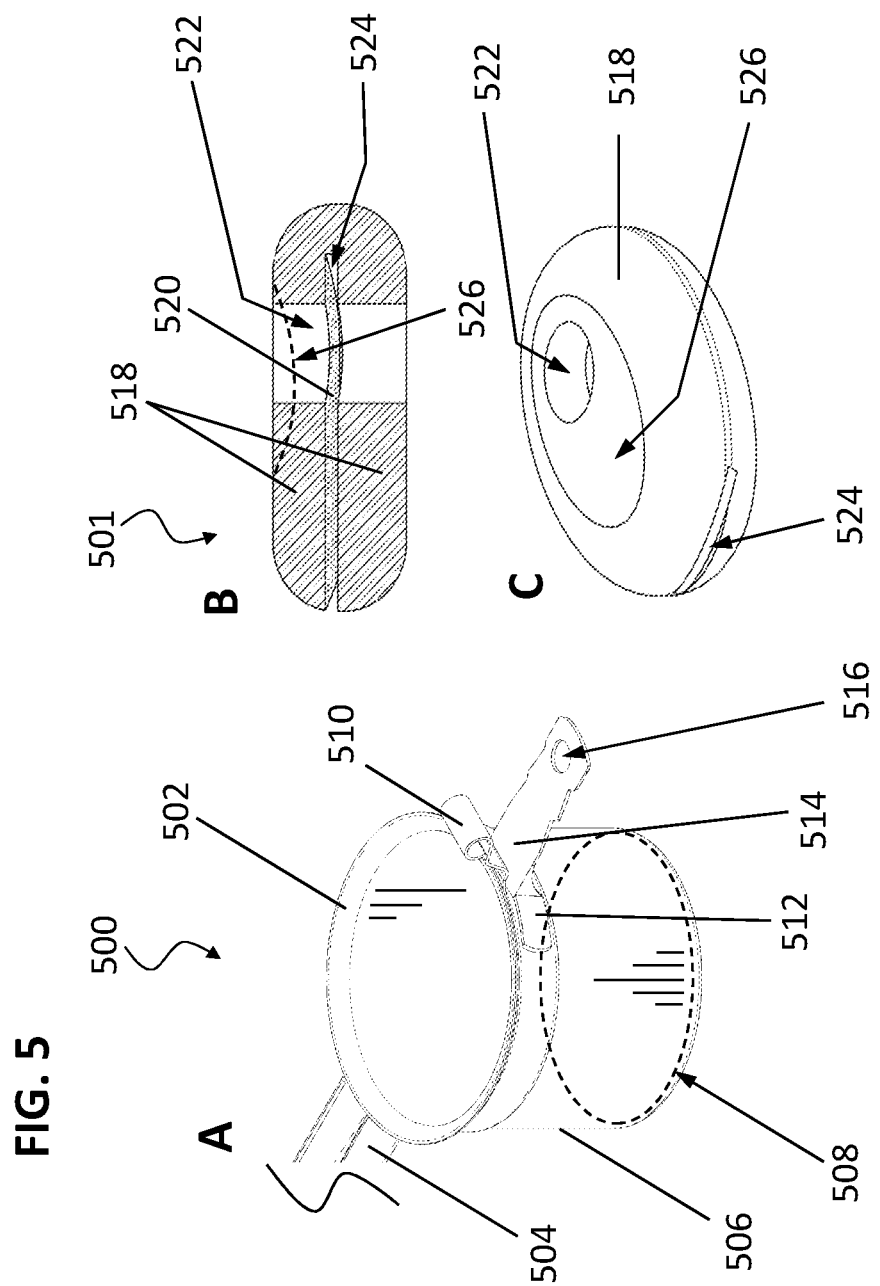
FIG. 5 shows a detailed view of one embodiment of a kitchen ricer tool's sleeve assembly, handle attachment means and handle.

FIG. 1 shows one embodiment of the present invention, a kitchen ricer tool 100 that features an (upper) removably insertable sleeve assembly 102 that can be fitted with any one of plurality of screen inserts (112, 114, 116), including, but not limited to, a patterned screen A (112), a coarse screen B (114) and a fine screen C (116) through which a food substance or material can be compressed and ejected therethrough by means of a pusher plate or plunger 104 that is pivotably attached to the upper handle assembly 106 by means of a pivoting means 105; wherein the pusher plate 104 can be inserted and lowered into the body assembly 108 portion of the kitchen ricer tool 100 to compress and rice a material previously placed within the body assembly 108, the upper handle assembly 106 being pivotably attached by a second pivoting means 105 to an upper handle pivot junction 109 (not shown here, but see detailed in FIG. 5, 510).

In the embodiment of the present invention shown in FIG. 1, the sleeve assembly 102 features an outer sleeve diameter that is slightly smaller in cross-sectional diameter than the opening of the body assembly 108, so that it can be inserted therein nearly to entirety or at least to a depth corresponding to the depth of the body assembly 108, or in another embodiment, at least to a depth exceeding the depth of the body assembly 108 so as to either be substantially aligned therewith, or alternatively, to extend slightly beyond the bottom thereof, respectfully, when fully inserted into the body assembly 108. In this embodiment, when the sleeve assembly 102 is fully inserted into the body assembly 108, the upper lip 107 of the sleeve assembly 102 engages with and nestles into or onto the upper lip 107 of the body assembly 108.

In this present embodiment, the sleeve assembly 102 features a sleeve handle 103 that is affixed to the top of the sleeve assembly and oriented in a normal manner perpendicular to the surface of the outer wall of said sleeve assembly 102, and sized both in width, length and height so as to nestle within a receptive region 111 of the lower handle assembly 110 when the sleeve assembly 102 is fully inserted into the body assembly 108 to its fullest allowable depth, serving to hold the sleeve assembly 102 and its handle 103 snuggly in position therein, respectively.

As shown in FIG. I, this embodiment of the present invention features both a sleeve assembly 102 and body assembly 108 that are essentially cylindrical constructs without bottoms, the circular bottom open areas of the two represented by the dashed lines, respectively.

At least one screen insert selected from a plurality of screens each featuring some unique pattern of openings, holes, shapes or cutouts, such as for example, but not limited to screen inserts shown (A, B, C) are removably insertable into the sleeve assembly 102 through the top opening thereof, and configured in size and outer perimeter features, such as for example a flange or lip, enabling the screen insert(s) to fit within the top opening and inner cylindrical space of the sleeve assembly 102, and engage with a lower internal lip (not detailed) located within the lower distal side and circumferentially within and around the inner diameter of the sleeve assembly 102 at the bottom opening of said 102. Any one of a plurality of screen inserts, 112, 114 or 116 in this inventive embodiment can then be removably inserted and positioned at the bottom and inside of the sleeve assembly 102, the outer rim of said screen inserts featuring a flange or lip with a complementary mating surface configured to engage the lower internal lip of the sleeve assembly 102, so that the screen inserts are secured in place therein. When at least one desired screen insert is in place within the sleeve assembly 102, the latter is then inserted into the body assembly 108 as described herein above. Advantages of having an internal sleeve assembly with a removably replaceable set of screen inserts according to this embodiment of the present invention includes the faster swapping out of screens, easier disassembly and cleaning of the inventive kitchen riser tool 100, and greater selection of screen patterns that can be used, including, but not limited to, those screen inserts 112, 114 and 116 shown in FIG. 1.

In operation, once a selected screen insert, say for example screen 112 is placed and fitted within the sleeve assembly 102, the latter is then inserted and fitted into the cylindrical opening of the body assembly 108, followed by the introduction of a volume or piece of food or material of size or volume approximately equal to, or slightly smaller in size or volume compared to the size of the inner void space of said sleeve 102, so that the material substantially fits within and occupies that inner void space. Next, the upper handle assembly 106 is pivoted about the pivoting means 105 at the attachment point between the handle assembly 106 and the body assembly 108 upper handle pivot junction 109, bringing the pusher plate 104 first into a concentric and co-aligned horizontal position with respect to the upper opening of 108, so that it is positioned in a manner by means of the second pusher plate 104 pivoting means 105 to be roughly parallel with respect to said upper opening of 108 and coaligned along a common central axis passing through the center of 102 and 108. Further pivoting of the upper handle assembly 106 then results in the pusher plate 104 entering the top opening of 102 in a parallel configuration, the outer circumferential edge of 104 having a diameter slightly less than the inner circumference of the cylinder walls of the sleeve assembly 102, providing a close but slidingly engageable clearance or separation between the two so that further pivoting of the upper handle assembly 106 causes the pusher plate 104 to enter the opening of sleeve assembly 102 and begin to act on, or compress, the material previously placed within. With yet further pivoting of the handle 106, the pusher plate 104 continues to move slidingly downward within the sleeve assembly 102 cylindrical wall, further compressing the material which at some point is compressed sufficiently within the enclosed space so as to be pressed against the inside (top) surface of the screen insert that has been emplaced within 102. Yet further pivoting of the handle 106 then serves to lower the pusher plate 104 even further, eventually resulting in it being pressed against the inside (top) surface of the screen insert, whereby the compressed material has been displaced and ejected through the one or more plurality of holes or openings within the screen insert, having been riced or divided into streams of material corresponding to the shape and size of said holes or openings. At this point, all or a substantial fraction of the matter has been successfully processed or riced, and little or no uncompressed or compressed matter remains inside the inside of the sleeve assembly 102, and the upper handle assembly 106 can be pivoted back in the opposite direction to withdraw the pusher plate 104 and eventually with greater pivoting move it vertically upward with respect to the bottom or screen insert and eventually free it from the sleeve assembly 102 in its entirety. At this point, an additional aliquot of food material or matter can be introduced into the sleeve assembly 102 as disclosed above, and the process repeated.

FIG. 1 also shows a series of screen inserts (112, 114, 116) that are representative embodiments of screens having different ricer patterns, being one or a plurality of openings spanning the cross-section of the screen insert body in the shape of holes, squares, swiggles, tear drops, lines, and any other geometric shape of choice corresponding to the desired cross-sectional pattern of the riced food stuff or material that is pushed through a selected screen insert. Although holes and tear-shaped openings are shown in these selected embodiments, any desired shape or shapes, repeated or intermixed between different shapes, and of any desired shape, and of any desired distribution or pattern, are suitably employed in the screen inserts of the present invention. In one embodiment of the present invention, the screen insert features a plurality of very fine openings in the form of holes that are sized so as not to allow the ready passage of a food material or matter, employed for the purpose of extracting a liquid, juice, essential oil or other pressably separable liquid from the food material under pressure. In other embodiments of the present invention, the screen insert features one or a plurality of openings allowing the passage of the food material or matter, which is extruded through the one or plurality of openings and takes on, at least in transit through the screen insert, the approximate geometric cross-section shapes of the one or more openings through which the matter passes.

Figure 2:
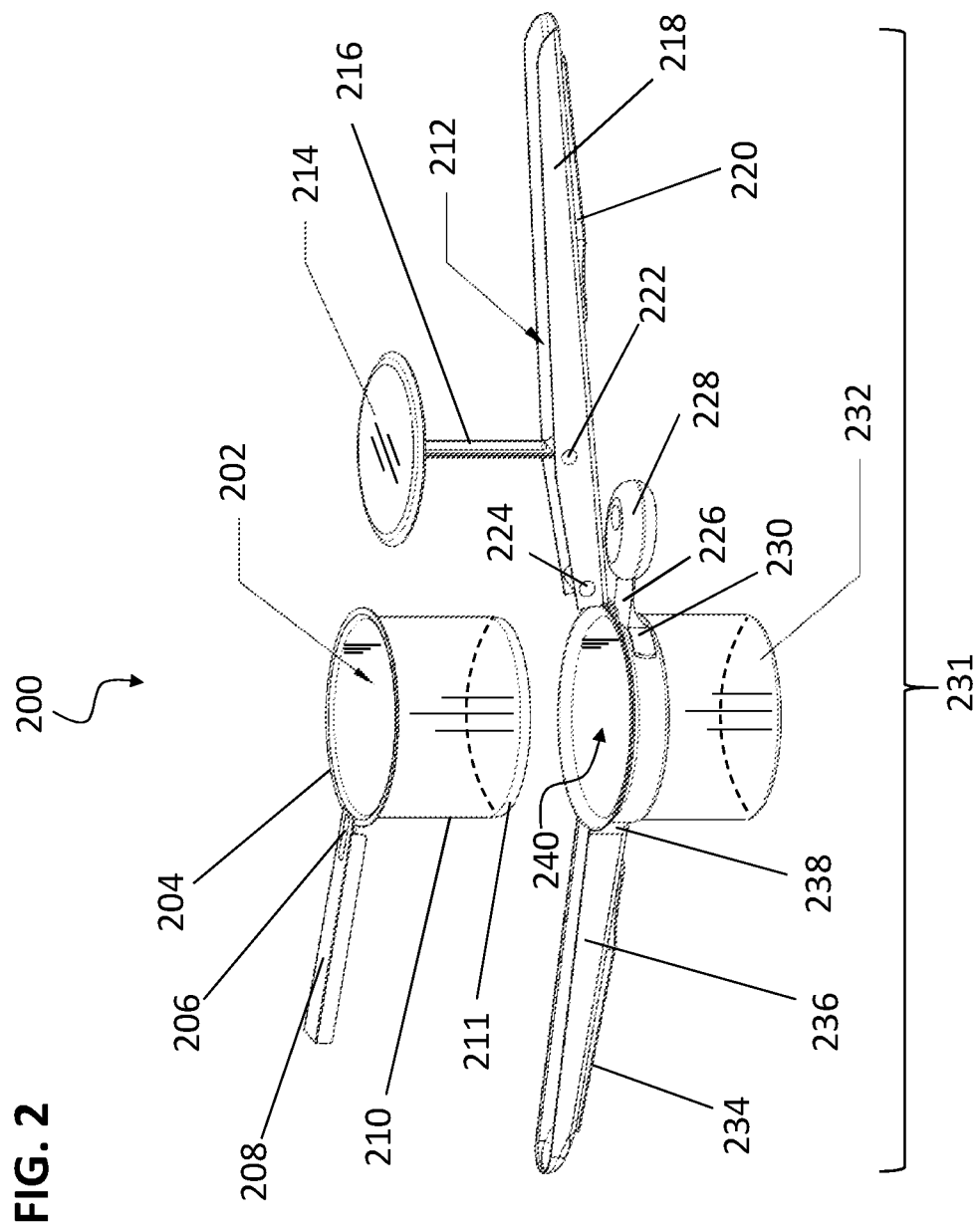
FIG. 2 shows a compound view of one embodiment of a kitchen ricer tool showing the various components and construction details.

FIG. 2 show another embodiment of the present invention, with additional components and their function described here for a kitchen ricer tool 200 featuring a sleeve assembly 202 having an sleeve upper rim 204 of a sleeve cylinder 210 with a sleeve handle flange 206 connected to the upper outer wall of the sleeve cylinder 210 and connecting to a sleeve handle 208 that allows handling and manipulation of the sleeve assembly 202. The sleeve handle flange 206 in one embodiment is a separate portion that enables interconnection of handle 208 to the sleeve cylinder 210, while in another embodiment, the sleeve handle flange 206 is a part of the sleeve handle 208, and which can be directly connected to the sleeve cylinder 210. Connection means for either the interconnection of 206 with 208 and 210, or the direct connection of a sleeve handle 208 having an integrated flange 206 connected to 210 include those connection means commonly used in the art to fixedly attach metal objects together, for example being, but not limited to, screws, rivets and other physical interconnection means, adhesive, glue, pressure welding, spot welding, tack welding, and the like.

The outer diameter of the sleeve upper rim 204 located on the upper circumferential opening of the sleeve assembly 202 is sized to have an outer diameter of a size at least equal to and preferably slighter larger than the inside diameter of the sleeve assembly receptacle 240, being the inside cylindrical void space of the lower body cylinder 232 which operates to receive the sleeve assembly 202 when the ricer tool 200 is assembled by combining 202 and 232.

In this embodiment of the present invention, the lower portion of the sleeve cylinder 210 features a sleeve screen insert retaining lip 211 that is internal to the cylinder 210, circumferentially disposed with 210 at the lower edge thereof, and of a slightly lesser inner diameter than the inner diameter of the sleeve cylinder 210. The sleeve screen insert retaining lip 211 operates to allow the removable placement of a screen insert (not shown, but as according to FIG. 1) into the inner region of the cylinder 210 and retention onto the retaining lip 211 so as to position the selected screen insert at the bottom (distal) end of the sleeve cylinder 210 and prevent the screen insert from falling through the distal opening thereof, instead acting to secure it in a fixed, horizontally aligned configuration with the bottom circumferential opening of 210.

In the inventive embodiment shown in FIG. 2, the upper handle body 218 is pivotably attached to the body cylinder 232 by a pivoting connection means here being a upper handle pivot pin 224 that enables the movement of 218 from an approximately outwardly horizontal position with respect to the top portion of 232 to an oppositely disposed horizontal position (shown in FIG. 4 to be discussed) wherein it is disposed over the lower handle body 236 on the other side of the body cylinder 232, when fully rotated about the upper handle pivot pin 224. Here, the pusher plate 214, being the means to compress a food material or matter that is to be placed within the sleeve assembly 202 for processing, is pivotably attached by a pivoting means, being a pusher rod pivot pin 222 that pivotably attaches the pusher rod 216 to the upper handle body 218. The pusher rod 216 is fixedly attached to the pusher plate 214 in a normal position perpendicular to the plane of the surface of the pusher plate 214, attached to the distal side of 214, the proximate side of 214 being the surface which engages with the food material or matter when the upper handle body 218 is moved accordingly during a press or ricing operation. In this embodiment, the upper handle body 218 also features an upper handle assembly channel 212, which is sized to a width and length, and proportioned in height to correspond to the width and overlapping length of the lower handle body 236 when the upper handle body 218 is fully pivoted from the position as shown in FIG. 2 (open position) to a second, essentially opposite position (closed position) wherein it is fully pivoted around the upper handle pivot pin 224 by approximately 180° with respect to the open position, wherein it comes into an essentially horizontal and correspondingly parallel configuration with respect to the lower handle body 236. The upper handle body 218 also features one or a plurality of upper handle arm ergonomic pads or inserts 220.

Figure 4:
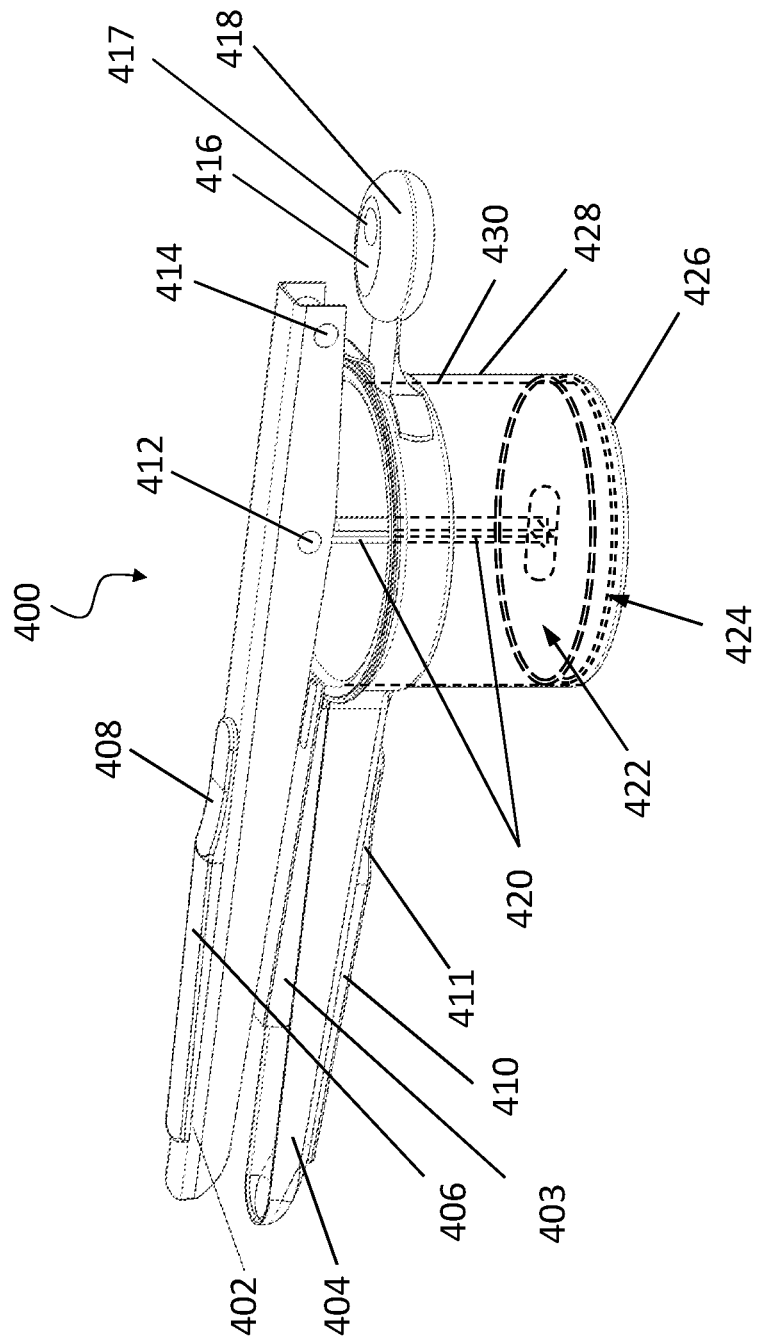
FIG. 4 shows a compound view of one embodiment of a kitchen ricertool in a closed configuration with articulating plunger engaged.

In this present embodiment shown in FIG. 2, the lower body assembly 231 includes the body cylinder 232, a lower body handle 236 attached to 232 by means of a lower handle flange 238, a thumb handle assembly 228 attached to 232 by means of an upper handle flange 226 that connects 226 to the outer cylindrical wall surface of the body cylinder 232 by means of a thumb handle flange 230. In other embodiments, the thumb handle flange 230 and the upper handle flange 226 can be either a single unit or two units attached together by some suitable means, a similar attachment means being employed to attach a mating surface of the thumb handle flange 230 to the surface of the outer cylindrical wall of body cylinder 232, including those attachment means described hereinabove with regard to attachment of the sleeve handle 208 and sleeve handle flange 206. In this embodiment, the lower handle 236 is configured in the manner of an open "U" channel, with the opening facing upward, providing a void space within that is sized in terms of length, width and profile so as to be able to receive the sleeve handle 208 when the sleeve assembly 202 is fully inserted into the sleeve assembly receptacle 240. This has the advantage of holding the sleeve assembly 202 in a rotational fixed manner with the sleeve handle 208 and lower handle body 236 in approximately parallel alignment, preventing sideways motion of the sleeve assembly 202 when it is so positioned (as shown in FIG. 4 to be discussed below). In this embodiment of the present invention the lower handle body 236 features a lower handle ergonomic pad 234 in the form of an insert that provides some comfort in the handling and manipulation of the body assembly 231 during use.

Figure 3:
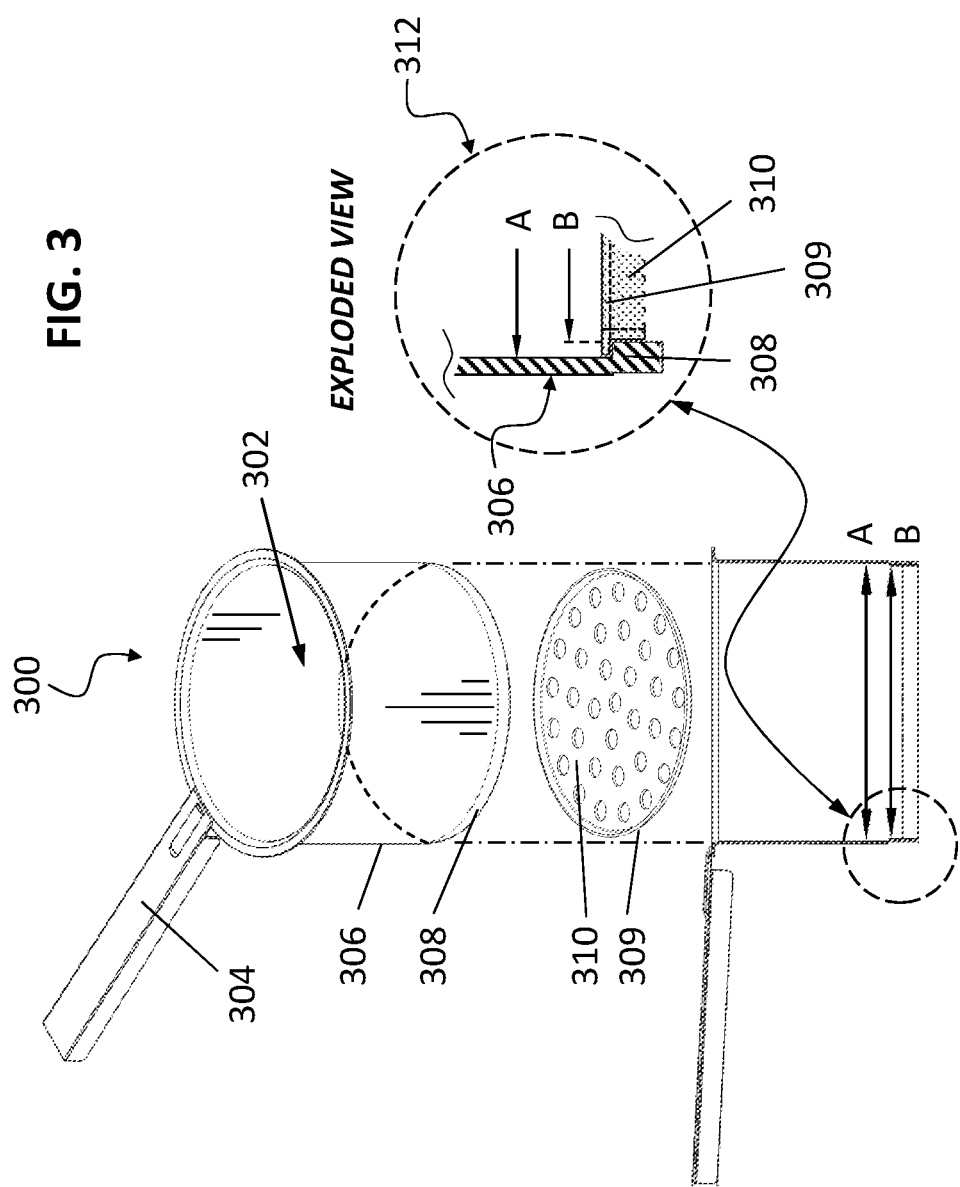
FIG. 3 shows an expanded view of one embodiment of a sleeve assembly and screens, including exploded view of screen coupling means with sleeve.

FIG. 3 shows another embodiment of a kitchen ricer tool 300, showing details of the sleeve assembly 302, here being in the form of a straight cylinder, being a cylinder with substantially straight walls and a substantially uniform inner and outer diameter along its length or height, with both upper and lower ends of the cylinder substantially open. The sleeve and sleeve cylinder wall 306 is sized (see dimension "A" in FIG. 3 and exploded view 312) with respect to the diameter of the pusher plate (see FIG. 2) so that the latter can fit within the sleeve assembly and move freely up and down along its length or height, the size those selected to have a small clearance distance or gap in order to accommodate the motion of the pusher plate without allowing food matter or material from flowing into the gap between the pusher plate and inner sleeve cylinder wall. Typically, in manufacturing processes, a clearance or gap of between 0.0001" to about 0.010", or alternatively, between 0.0005 and 0.005", or alternatively between 0.001" and 0.010", or alternatively between 0.005" and 0.02".

In this embodiment, the sleeve assembly 302 has an upper lip 303 that extends circumferentially around the upper end of the sleeve cylinder with an outer diameter selected to be at least as large as the outer diameter of the top opening in the cylinder comprising the wall of the lower body assembly as discussed hereinabove, so that when the sleeve assembly 302 is placed with the lower body assembly, the upper lip 303 acts to retain the sleeve cylinder in place and prevent its further downward movement into the lower body assembly, the upper lip 303 nestling against the top of the sleeve cylinder or in an alternative embodiment, nestling against the top of a lip present on the top of the sleeve cylinder.

In this embodiment, the sleeve assembly 302 also has a lower lip or sleeve screen retaining lip 308 that extends circumferentially within the lower end of the sleeve cylinder with an inner diameter selected to be at least as large as the outer diameter of the one or more pluralities of screen inserts 310 that are to be used by insertion into the inner cavity or void space of the sleeve assembly 302 and position in immediate contact with said sleeve retaining lip 308, so that the removable and replaceable screen insert(s) nestle at the lower end with the outer lip 309 of the screen insert 310 in contact with the inner, sleeve screen retaining lip 308 which has an inner diameter shown by dimension "B" in FIG. 3, as more clearly shown in the exploded view 312. In this particular embodiment and related embodiments of the present invention, the sleeve screen retaining lip 308 has a dimension equivalent to dimension "B" and may be formed by any know method in the art during the fabrication of the sleeve cylinder 306 and the sleeve assembly 302. When the sleeve cylinder 306 is made of a malleable material such as metal, its lower end and edge thereof can be forged, pressed, bent, folded or otherwise mechanically altered to form a retaining lip according to the present invention. In a similar manner, when the sleeve insert 310 is made of a malleable material such as metal, its outer circumferential edge can be forged, pressed, bent, folded or otherwise mechanically altered to form an outer lip 309 according to the present invention. In further embodiments, the diameter, height, aspect ratio and diameters of the respective sleeve screen retaining lip 308 and the outer lip 309 of the screen insert 310 are selected so that their interacting portions (the lips of each) substantially complement one another for the purpose of retaining the screen insert 310 at the lower or bottom end of the sleeve cylinder 306 of the sleeve assembly 302 when a screen is inserted therein.

In other related embodiments, the diameter, height, aspect ratio and diameters of the respective sleeve screen retaining lip 308 and the outer lip 309 of the screen insert 310 can be of any style other than the "flat" style lip shown herein, including a taper, wedge, indent, bead, groove or other geometrically defined surface that has a correspondingly opposite mirror image shape or contour featured on the outer perimeter or periphery of the selected screen inserts that enables approximate mating, coupling, overlapping or interference fitting between the two lips, sufficient for the purpose of retaining the screen insert 310 having a first lip 309 at the lower or bottom end of the sleeve cylinder 306 of the sleeve assembly 302 having the second lip 308, when a screen is inserted into the sleeve assembly 302.

Accordingly, a user can easily place a screen insert 310 into the inside cylinder 306 of the sleeve assembly 302 and either manually position the screen insert or allow it to drop into place and be secured at the bottom of the sleeve assembly, being retained there by means of the corresponding lips (308, 309) or any equivalent means as disclosed herein, where the screen insert 310 is prevented from falling through the bottom or distal opening of the sleeve cylinder 306. The screen inserts 310 are easily displaced and removed from the sleeve assembly 302 by either manual means or by inverting the sleeve assembly 302 and allowing the screen insert to fall back and exit through the top of 302.

FIG. 4 shows a related embodiment of the present invention, a kitchen ricer tool 400 where a screen insert 424 is in place within the sleeve assembly 430 (the sleeve cylinder wall being shown by dashed lines) where the sleeve assembly 430 itself has been placed within the lower body cylinder 428 (the wall of which is indicated by a solid line). Thus positioned, the lip of the screen insert is retained on the sleeve screen retaining lip 426.

In the embodiment shown here, the kitchen ricer tool 400 has an upper handle assembly 402 that features a first and second pivot point, located at 412 and 414, being a pusher rod pivot pin 412 and an upper handle pivot pin 414, the latter enabling the upper handle assembly 402 to be moved approximately 180° from a closed position as shown in FIG. 4 to a fully extended open position as shown in FIG. 3, pivoting about a second pivot axis corresponding to an axis passing through the pusher rod pivot pin 412 at the second pivot point. The first pivot point located at 412 and corresponding to the pusher rod pivot pin 412 enables the pusher rod 420 to pivot about an axis passing through the pusher rod pivot pin 412 at the first pivot point, enabling the pusher rod 420 to move the pusher plate 422 into the proximate end of the sleeve cylinder of the sleeve assembly 430 and then further down until the pusher plate 422 is brought into approximate contact with the upper surface of the screen insert 424 located at the bottom or distal end of the sleeve cylinder 430.

FIG. 4 illustrates how the pusher plate 422, connected by means of the pusher rod 420 to the pusher rod pivot pin 412 which is connected to the upper handle assembly 402 at a second pivot position (corresponding to the location of 412), is positioned when fully inserted into the sleeve cylinder 430 at the bottom of its travel therein. At this fully inserted position of the pusher plate 422, the upper handle assembly 404 has fully pivoted about the first pivot position corresponding to the upper handle pivot pin 414, bring the upper handle assembly 404 into approximately alignment with, and into a substantially horizontal and parallel orientation with respect to the lower handle assembly 404.

The sleeve handle 403 becomes positioned substantially within the void space defined by the open U-channel of the lower handle assembly 404 when the sleeve assembly 430 is placed within the lower body assembly 428, so that the sleeve handle 403 does not interfere with or come into contact with the upper handle assembly 402 when it is oriented in a position as shown in FIG. 4. Both the lower handle assembly 404 and the upper handle assembly 402 feature ergonomically shaped and contoured grip inserts, including an ergonomic lower thumb pad 411, lower finger pad 410, upper hand pad 406 and upper thumb pad 408.

Also shown in the embodiment illustrated in FIG. 4, the body cylinder 428 features a thumb handle assembly 418 having a thumb indent 416 and a thumb handle connector 417 that enables the connection of the thumb handle assembly 418 to a thumb handle flange (230 in FIG. 2).

In operation, the combination of the upper and lower handle assemblies (402 and 404) with the thumb handle assembly 418 enables a user to hold the first set of handles in one first hand, and hold the thumb handle assembly in the second, other hand, optionally using the thumb of the second hand to pinch and hold the thumb handle assembly 418 between the thumb and at least one finger of the second hand to stabilize the position of the kitchen ricer tool 400 as the upper handle assembly 402 is moved into position as shown during a ricing maneuver wherein a food material or matter placed within the sleeve assembly 430 is compressed or acted upon by pressure exerted by the user on the upper handle assembly 402 that is communicated to the food material by means of the descending pusher plate 422 by means of the compression force being transmitted to the plate 422 by the pusher rod 420 through the pusher rod pivot pin 412 motion in response to the applied force by the user bringing the upper handle assembly 402 into the closed position in the embodiment of the present invention as shown in FIG. 4.

FIG. 5 shows details of one embodiment of the present invention regarding the pivoting means and attachment means, and options thereof, for the attachment and manipulation of handles and knobs associated with the insertable sleeve assembly 500 (A). Here, the sleeve assembly 500 features a upper sleeve assembly lip 502 formed on the proximate or top end of the sleeve cylinder 506 as described hereinabove, and a lower body screen (filter) retaining lip 508 located on the distal or bottom end of 506 as described hereinabove for retaining a selected sleeve screen at the distal end of 506 when a sleeve screen is inserted therein. The sleeve assembly 500 has a sleeve handle 504 attached close to the proximate end of the sleeve assembly 500 and below the upper sleeve assembly lip 502, positioned so that it will fit with the lower body handle assembly's U-channel as disclosed and described in detail hereinabove. In this embodiment, a single component or compound assembly (510, 512, 514) is attached to the sleeve cylinder wall 506 at a location proximate to, but below the screen assembly lip, and at a position directly opposite to that the opposed sleeve handle 504, providing a pivoting means for the upper lower body handle assembly (not shown) and an attachment means for the thumb handle assembly 501. Here, a single component embodiment optionally combines 510, 512 and 514 as formed from a single piece of material by any suitable means of processing, here for a metal unit involving the steps of stamping, folding and bending of a metallic stamp pattern into the approximate configuration shown.

Alternatively, a compound assembly embodiment optionally combines 510, 512 and 514 as separate formed pieces of material or combinations of these assemblies together to form the compound assembly, by any suitable process, including but not limited to those described immediately above, and combined by any suitable means as disclosed herein, including for example, but not limited to, adhesive bonding, spot welding, thermal bonding, tack welding, and the like. In this latter embodiment, the compound assembly can be fashioned and formed in any manner and connected together in any manner and attached to the sleeve cylinder wall 506 in any manner, so as to provide a pivoting junction and a means for attaching a thumb handle assembly 501 as shown in FIG. 5. Band C.

FIGS. 5 Band C show one embodiment of a thumb handle assembly 501 which is constructed roughly in the shape of a knob featuring a thumb handle body 518 which as an opening 522 that passes through the cross-section of 518 and a thumb recess region 526 (denoted in cross section by dotted lines) that is shaped to accommodate the placement of a finger or thumb of a user. In this embodiment a thumb handle retaining spring 520 is located within a tang slot or spring receptacle region 524 that has an opening on one side of the thumb handle body 518 that can accommodate the retaining sprint 520 and also can receive the protruding end of the thumb handle tang 514, the latter which when inserted into 524 enables the thumb handle locking cutout 516 (bore or hole) present near the insertable end of 514 to engage with a portion of the retaining spring 520 that is position and is downwardly biased (bent) at the position of the thumb handle opening 522 so that a portion of the retaining spring 520 engages in part with the locking cutout 516 to secure the thumb handle tang 514 in position within the thumb handle tang slot 524. In this instant embodiment, a thumb handle assembly 501 that has been engaged with the thumb handle tang 514 as described immediately above, can then optionally be removed from 514 by means of pressing upward with an object or tool placed in the bottom side of the thumb handle opening 522 that acts against the downwardly biased or bent portion of the retaining spring 520 accessible through the opening 522, releasing the thumb handle locking cutout 516 from the biased retaining spring 520, and enabling the withdrawal of the unengaged 514 and 516 portions of the thumb handle tang 514 from the thumb handle tang slot or receptacle region 524 of the thumb handle body 518. In normal use, the thumb handle assembly 501 is generally left engaged with the thumb handle tang 514, but can be replaced as disclosed if broken.

While this particular embodiment is shown in FIG. 5 A, Band C, other suitable means for either reversibly or permanently attaching a thumb handle assembly 501 to the thumb handle tang 514 present on the cylinder wall 506 of the sleeve assembly 500 are also encompassed by the present invention, including but not limited to those attachment means disclosed herein for attaching flanges together and to other portions or surfaces of the devices of the present invention.

Figure 6:
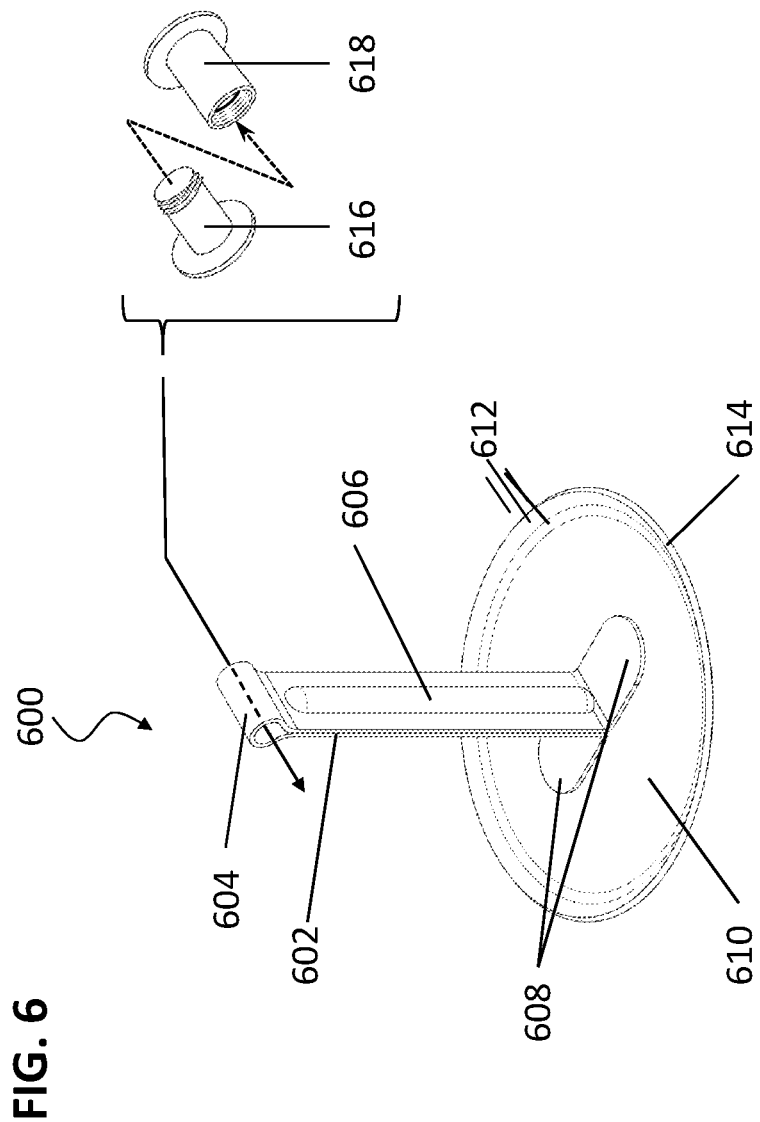
FIG. 6 shows a detailed view of one embodiment of a kitchen ricer tool's plunger assembly and articulating coupling means.

FIG. 6 shows one embodiment of the present invention illustrating a pusher assembly 600 that consists of a pusher rod 602 attached to a pusher plate 610. Here, the pusher rod 602 is formed from a single piece of material that has been formed into a pusher rod 602 featuring a pusher rod pivot hinge portion 604, and two pusher rod flanges 608 that provide a pivot point for the upper handle assembly as described herein, and an attachment surface for connecting flanges 608 to a top or proximate surface of the pusher plate 610. In this embodiment, two flanges 608 are shown, but any configuration providing a surface or means for attachment to pusher plate 610 is contemplated by the present invention, including other shapes, configurations and forms of a pusher rod 602 that provides at least one pusher rod pivot hinge portion 604 that can accommodate a pivoting means such as a bar, bolt, rod, pin, screw, spring, rivet or other similar and similarly functioning means to enable rotation of 604 with respect to the upper handle assembly (see for example 402 in FIG. 4) and corresponding pusher rod pivot pin 412, here being a threaded and coupled male and female flanged rivet 616 and 618, respectively. In operation, the upper handle assembly 402 and the pusher assembly 600 freely pivot about an axis passing through the center of the pusher rod pivot hinge portion 604 as shown if FIG. 6, which corresponds to the center axis of the pivoting means, here being 616 and 618. During assembly of an embodiment of the present invention, the pusher assembly 600 is connected to the upper handle assembly 402 by means of the flanged rivet set 616 and 618, the flanges being larger than the internal diameter of the bore or opening in 604 and the bores or openings present in the upper handle assembly 402 that receive both flange rivets 616 and 618.

In the particular embodiment as shown in FIG. 6, the pusher rod 602 includes a reinforcement emboss 606 present on one or both sides of 602 that provides improved strength and rigidity to the pusher rod 602. In other related embodiment, this is optional, depending on the nature of the pusher rod 602, which includes other structural elements and forms, including but not limited to rods, tubes, plates and any other shaped material that is able to transmit force exerted to the pusher plate 610 my means of force applied to the pusher rod pivot hinge portion 604 of the pusher assembly 60.

Further, the embodiment in FIG. 6 also shows a pusher plate 610 having a pusher plate rim 612 as part of the pusher plate flange 614 present around the entirety of the outer circumferential perimeter or periphery of 610, the pusher rod 602 being attached to the upper or proximate side with a center axis thereof aligned coincidently with the center perpendicular axis of the pusher plate 610.

FIG. 7 shows details of one embodiment of the present invention wherein the upper handle assembly 700 consists of a upper handle 704 in the form of a U-channel having at least one or a plurality of grip plug engagement slots 716 that are sized, shaped and spaced appropriately to match and accommodate the insertion and retention of corresponding grip installation plugs 714 (A, B and C) into the corresponding slots A, B and C (716) formed into the upper handle 704, thus serving as a means to attach and retain the upper handle grip insert 702 onto 704. The upper handle grip insert 702 comprises the upper handle grip assembly 701 in this embodiment, having a grip top surface 710 that is relatively long in length compared to the upper handle 704 so as to accommodate contact with a user's palm or fingers; a grip thumb engagement area 712 to accommodate contact with a user's thumb or finger; and a front 713 grip portion to further accommodate contact with a user's thumb or finger when the upper handle assembly 700 is being gripped or held by a user. The upper handle grip assembly 701 in this particular embodiment is a single molded piece of a suitable rubber or elastomer whose physical properties provide cushioning and an ergonomic function, as well as being sufficiently malleable to enable the shaped plugs A, B, C (714) to be inserted into the corresponding engagement slots A, B, C (716) of the upper handle u channel 704, whereby they resume their original shapes whose lips 720 act to engage the plugs into the slots and hold the upper handle grip inset 702 securely in place. The shape of the upper handle grip assembly includes a grip top surface 710 and a grip plug male head 720 connected by a slightly smaller diameter or cross-sectional recessed grip plug body 718 whose size, shape, orientation and aspect match one or more of the grip plug engagement slots 716 located on the upper handle u-channel 704, the recesses 722 between 710 and 720 providing an engagement region to accommodate the one or more engagement slots A, B, C corresponding to cutouts 716.

In other embodiments, the upper handle assembly 700 can be constructed and fashioned in any different numbers of ways, such as for example, being molded as a single piece of material having the same or similar overall shape and profile as the combined upper hand u-channel 704 and upper handle grip 701. In yet other embodiments, the upper handle grip 701 can be formed from as a single unit, or as two or three separate units which when combined provide the same gripping contour and aspect as that shown in FIG. 7. In yet additional embodiments of the present invention, the upper handle grip 701 can be of any desired shape or size or material that provides at least one functional benefit selected from, but not limited to, cushioning, grip improvement, ergonomic advantage, non-slip, comfort and ease of handling, and combinations thereof.

In the embodiment of the present invention as shown in FIG. 7, the upper handle pusher hinge bore or cutout 706 and upper handle sleeve hinge bore or cutout 708 are more clearly seen, aligned along the indicated axis corresponding to 706 and 708.

The lower handle assembly as described herein also features a lower handle grip assembly (410, 411 as shown in FIG. 4 and a lower handle front grip portion 413 not shown) that is identical to the upper handle grip assembly 701. In other embodiments the lower handle grip assembly can be of a different configuration that that of the upper handle grip assembly. However, in a preferred embodiment, the upper and lower handle grip assemblies are identical, as well as the corresponding grip plug engagement slots, for economy in the production and ease of assembly of the two handle assemblies with an ergonomic insert.

Further, while the lower and upper handle assembly in the embodiments of the present invention are described a u-channel structures, they may in other embodiments be shaped differently or formed in any other acceptable shape or manner, provided they include some accommodation for a pivoting means or have at least a pusher hinge bore and a sleeve hinge bore for receiving a pivoting means to engage the pusher plate assembly and upper handle pivoting junction as disclosed herein that in turn provide a means for the upper handle assembly to be moved while simultaneously positioning the pusher plate assembly into the open cylinder of the screen assembly as well as withdrawing the pusher plate assembly from the open cylinder of the screen assembly when the upper handle assembly is moved or positioned in the opposite direction.

FIG. 8 shows several embodiments of a screen insert 800 that can be used in conjunction with the sleeve assembly of the present invention as disclosed herein. Here, screen insert C (802) features a plurality of small evenly spaced round cutouts, holes, perforations or bores that pass through the flat body of the screen insert. In the lower trace, screen insert A (804) features a plurality of spaced "tear-shaped" cutouts that pass through the flat body of the screen insert 812 as perforated holes, or perforates.

In other related embodiments of the present invention, a screen insert can have one or a plurality of perforates of any size, shape, orientation and number, in order to provide a variety of riced shapes when used to compress and extrude a food material or other matter through the screen insert. In these related embodiments, the cross-sectional shape of the extruded food material or other matter would take on the shape, at least instantaneously during the passage through the one or more perforates, of the one or more perforates present in the screen insert during the extrusion or ricing process.

In embodiments where the nature of the perforates is too restrictive (too small) with respect to the food material or matter to allow the physical passage of the material therethrough, the restrictive perforates could still allow the passage of liquid components, such as water, juice, oils and other liquid constituents thereof.

Also shown in FIG. 8 are two embodiments of a screen insert according to the present invention featuring two outer perimeter lip and rim configurations. In other embodiments, any suitable size, shape, aspect or configuration of the outer perimeter or edge of a screen insert may be adopted, provided that a correspondingly suitable size, shape, aspect or configuration of a screen retention lip and rim is adopted that provides a means for reversibly engaging a screen insert at the bottom of a screen cylinder assembly as disclosed herein.

In the first embodiment (A) shown in FIG. 8, the top 806 of the screen insert defines the outer perimeter and further features a beveled rim 808 formed along the perimeter in the form of a tapered edge 810 that tapers from a larger dimension to a smaller dimension with respect to the cross-sectional diameter of the screen insert as it tapers from the top 806 side of the screen to the bottom 807 of the screen, the body perforate section 812 of the screen being at the bottom thereof.

In this particular embodiment labeled A, the inside screen retention lip of the screen insert assembly would be shaped in a manner to enable it to physically accommodate and mate with the beveled rim 808 and tapered edge 810 of the screen insert as shown in FIG. 8 A.

In a second embodiment (B) shown in FIG. 8, the top 806 of the screen insert defines the outer perimeter and further features a flange 814 formed along the perimeter in the form of a flat lip or rim 814 transitions to a flat edge 816 with a smaller dimension than the rim 814, the body perforate section 812 of the screen being at the bottom thereof. In both embodiments A and B, the lower bottom edge of the screen body 812 (perforated disc portion) is optionally radiused with a slight bevel so that the bottom outer edge or perimeter of the screen inserts are not sharp right angles, in order to more easily facilitate the positioning of the screen inserts into the screen assembly.

Materials of Construction

The components, parts and assemblies of the kitchen ricer tool as described above in various embodiments may be fashioned from or constructed of any suitable material, for example including but not limited to, alloys, metal, plastic, polymeric resin, and the like, and combinations thereof. A preferred material of construction for the screen cylinder, body assembly, handles and pusher assembly is a metal, for example including but not limited to, aluminum, iron, steel, stainless steel, titanium, copper, brass, tin, and alloys thereof, and combinations thereof. A preferred material of construction for the ergonomic pad inserts and components thereof include for example, but is not limited to, an elastomer, a silicone material, plastic, rubber, polymer, resin and the like, and combinations thereof. In a further preferred embodiment, all the materials and components of the kitchen ricer as disclosed herein are constructed of durable, corrosion- or degradation-resistant materials that are safe for food contact, easily cleaned by manual or automatic dishwashing means, and thermally and dimensionally stable to higher temperatures likely to be encountered during use or during a cleaning operation.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

APPENDIX

FIGURE KEY

FIG. 1

100 Kitchen Ricer Tool
102 Sleeve assembly; 107 Upper lip
103 Sleeve handle
104 Pusher plate
105 Pivoting means
106 Upper handle assembly
108 Body assembly; 109 Upper lip
110 Lower handle assembly
112 Screen insert A
114 Screen insert B
116 Screen insert C

FIG. 2

200 Kitchen Ricer Tool
202 Sleeve assembly
204 Sleeve upper rim
206 Sleeve handle flange
208 Sleeve handle
210 Sleeve cylinder
211 Sleeve screen insert retaining lip
212 Upper handle assembly channel
214 Pusher plate
216 Pusher rod
218 Upper handle body
220 Upper handle arm ergonomic pad
222 Pusher rod pivot pin
224 Upper handle pivot pin
226 Upper handle flange
228 Thumb handle assembly
230 Thumb handle flange
231 Body assembly
232 Body cylinder
234 Lower handle ergonomic pad
236 Lower handle body
238 Lower handle flange
240 Sleeve assembly receptacle

FIG. 3

300 Kitchen Ricer Tool
302 Sleeve assembly
304 Sleeve handle
306 Sleeve cylinder (wall)
308 Sleeve screen retaining lip
310 Screen insert
312 Expanded view detail
A - Inner sleeve diameter
B - Inner retaining lip diameter

FIG. 4

400 Kitchen Ricer Tool
402 Upper handle assembly
403 Sleeve handle
404 Lower handle assembly
406 Ergonomic hand pad
408 Thumb pad
410 Ergonomic finger pad
411 Lower thumb pad
412 Pusher rod pivot pin
414 Upper handle pivot pin
416 Thumb indent
417 Thumb handle connector
418 Thumb handle assembly
420 Pusher Rod
422 Pusher plate
424 Screen insert
426 Sleeve screen retaining lip
428 Body cylinder (outer wall)
430 Sleeve cylinder (inner dot trace)
418 Thumb handle assembly
420 Pusher Rod
422 Pusher plate
424 Screen insert

FIG. 5

APPENDIX-continued

FIGURE KEY

500 Sleeve assembly (A)
501 Thumb handle assembly (B &C)
502 Sleeve assembly lip
504 Sleeve handle
506 Sleeve cylinder wall
508 Sleeve screen retaining lip
510 Upper handle pivot junction
512 Thumb handle flange
514 Thumb handle tang
516 Thumb handle locking cutout
518 Thumb handle body
520 Thumb handle retaining spring
522 Thumb handle opening
524 Thumb handle tang slot (receptacle)
526 Thumb handle recess
FIG. 6

600 Pusher assembly
602 Pusher rod
604 Pusher rod pivot hinge portion
606 Pusher rod reinforcement emboss
608 Pusher rod flange
610 Pusher plate
612 Pusher plate rim
614 Pusher plate flange
616 Flanged rivet (female side)
618 Flanged rivet (threaded male side)
FIG. 7

700 Upper handle assembly
701 Upper handle grip detail
702 Upper handle grip insert
704 Upper handle u channel
706 Upper handle pusher hinge bore
708 Upper handle sleeve hinge bore
710 Grip top surface
712 Grip thumb engagement area
713 Front
714 Grip installation plugs A, B, C
716 Grip plug engagement slots
718 Grip plug body
720 Grip plug male head
722 Grip plug slot engagement area (gap)
FIG. 8

800 Screen insert detail
802 Screen Insert C
803 Holes (perforated)
804 Screen insert A
806 Top
807 Bottom
808 Beveled rim
810 Tapered edge
812 Screen body perforate
814 Flanged rim
816 Flat edge

The invention claimed is:

1. A ricer tool comprising:
a lower body assembly defining a first straight cylinder having a first opening located on a top end of the first cylinder and a second opening located on a bottom end of said first cylinder;
a strainer assembly defining a second straight cylinder having a third opening with a circumferential internal flange located at a distal end of said second cylinder and a fourth opening with a circumferential external flange located at a proximate end of said second cylinder;
a first screen insert and a second screen insert;
wherein said first screen insert and said second screen insert are interchangeable with one another;
wherein said first screen insert has a circumferential flange located around its outer perimeter;
wherein said fourth opening of said strainer assembly is receptive to receive said first and second screen inserts;
wherein said circumferential flange of said first screen insert engages with said internal flange of said strainer assembly when said first screen insert is further advanced into position adjacent to said third opening at said distal end of said strainer assembly and contacts said internal flange of said strainer assembly;
a pusher plate;
wherein a proximate face of said pusher plate is connected to a proximate end of a pusher rod, wherein a distal end of the pusher rod is hingedly connected to a first pivoting junction on a pivoting handle; wherein said pivoting handle has a second pivoting junction connected to a third pivoting junction located on an outer cylinder wall of said lower body assembly;
wherein said pivoting handle pivots about said second and third pivoting junctions and said distal end of said pusher rod pivots about said first pivoting junction to bring said pusher rod and said pusher plate into said proximate fourth opening of said strainer assembly and to move a distal face of said pusher plate in a direction of said distal third opening of said strainer assembly;
wherein a position of each of said first, second and third pivoting junctions are selected to enable said pivoting handle to reversibly move said pusher plate into a position immediately adjacent said fourth opening of said strainer assembly and reversibly move said distal face of said pusher plate into contact with said first screen insert located at said proximate third opening of said strainer assembly.

2. The ricer tool of claim 1 wherein said circumferential flange of said first screen insert defines a flat rim; and wherein said circumferential internal flange located at said distal end of said strainer assembly has a shape complementary to said shape of said circumferential flange of said first screen insert.

3. The ricer tool of claim 2, wherein said first screen insert has a plurality of holes; wherein the shapes of said holes include at least one of round and tear-shaped.

4. The ricer tool of claim 2, wherein the outer diameter of said circumferential flange of said first screen insert is smaller than the inner diameter of said first opening in said lower assembly; wherein the outer diameter of said circumferential flange is larger than the inner diameter of said internal flange of said strainer assembly; and wherein said circumferential flange of said strainer assembly mates with said internal flange of to stabilize its position at said proximate third opening of said strainer assembly.

5. The ricer tool of claim 1, wherein said first straight cylinder of said lower body assembly and said second straight cylinder of said strainer assembly have circular cross-sections.

6. The ricer tool of claim 1, wherein said lower body assembly has a lower handle connected to an outer cylindrical wall thereof.

7. The ricer tool of claim 6, wherein the lower handle is fixedly attached at a first position on the top end of said lower body assembly in a perpendicular orientation with respect to a normal axis coincident to a plane of a surface of said outer wall.

8. The ricer tool of claim 7, wherein the pivoting handle is pivotably attached to said lower body assembly by means of said second pivoting junction connected with said third pivoting junction by a pivoting means having a first pivoting axis; wherein said third pivoting junction is fixedly attached at the top end of said lower body assembly at a position directly opposite said first position of said lower handle.

9. The ricer tool of claim 8, wherein said pivoting handle pivots about said first pivoting axis; wherein said pivoting handle can pivot 180° about said first pivoting axis from a first open position to a second closed position wherein said pivoting handle is brought into an approximately parallel configuration with respect to the orientation of said lower handle.

10. The ricer tool of claim 9, wherein said pusher rod pivots about said first pivoting junction having a second pivoting axis; wherein said pusher rod and attached pusher plate move into alignment with a center axis of said straight cylinder of said strainer assembly when said pivoting handle pivots about said first pivoting axis.

11. The ricer tool of claim 10, wherein said distal end of said pusher rod is pivotably connected to said pivoting handle at said second pivoting axis located at said first pivoting junction that is a distance equivalent to one half the inner diameter of the cylinder of said lower body assembly with respect to said first pivoting axis located at said second pivoting junction so that when said pivoting handle is pivoted about said first pivoting axis, the second pivoting axis moves into alignment with said center axis of the straight cylinder of said strainer assembly.

12. The ricer tool of claim 6, wherein at least one of said lower handle and said pivoting handle feature an ergonomic surface on a respective hand engagement side thereof; wherein said ergonomic surface is an insert attached to a hand engaging surface thereof; and wherein said insert is constructed of an ergonomic material selected from a copolymer, elastomer, latex, polymer, resin, rubber, and silicone.

13. The ricer tool of claim 12, wherein said lower body assembly features at least one thumb handle assembly.

14. The ricer tool of claim 13, wherein said thumb handle assembly is located immediately opposite said lower handle and adjacent to said pivoting handle at a position on the outer cylinder of said lower body immediately below said third pivoting junction.

15. The ricer tool of claim 14, wherein said thumb handle assembly includes an ergonomic material selected from a copolymer, elastomer, latex, polymer, resin, rubber, and silicone.

16. A ricer tool comprising:
a lower body assembly defining a first straight cylinder having a first opening located on a top end of the first cylinder and a second opening located on a bottom end of said first cylinder;
a strainer assembly defining a second straight cylinder having a third opening with a circumferential internal flange located at a distal end of said second cylinder and a fourth opening with a circumferential external flange located at a proximate end of said second cylinder;
a first screen insert and a second screen insert;
wherein said first screen insert and said second screen insert are interchangeable with one another;
wherein said first screen insert has a circumferential flange located around its outer perimeter;
wherein said fourth opening of said strainer assembly is receptive to receive said first and second screen inserts;
wherein said circumferential flange of said first screen insert engages with said internal flange of said strainer assembly when said first screen insert is further advanced into position adjacent to said third opening at said distal end of said strainer assembly and contacts said internal flange of said strainer assembly;
wherein said circumferential flange of said first screen insert defines a flat rim; and wherein said circumferential internal flange located at said distal end of said strainer assembly has a shape complementary to said shape of said circumferential flange of said first screen insert;
wherein said first screen insert has a plurality of holes; wherein the shapes of said holes include at least one of round and tear-shaped;
a pusher plate;
wherein a proximate face of said pusher plate is connected to a proximate end of a pusher rod whose distal end is hingedly connected to a first pivoting junction on a pivoting handle;
wherein said pivoting handle has a second pivoting junction connected to a third pivoting junction located on an outer cylinder wall of said lower body assembly;
wherein said pivoting handle pivots about said second and third pivoting junction and said distal end of said pusher rod pivots about said first pivoting junction to bring said pusher rod and said pusher plate into said proximate fourth opening of said strainer assembly and to move a distal face of said pusher plate in a direction of said distal third opening of said strainer assembly;
wherein a position of each of said first, second and third pivoting junctions are selected to enable said pivoting handle to reversibly move said pusher plate into a position immediately adjacent said fourth opening of said strainer assembly and reversibly move said distal face of said pusher plate into contact with said first screen insert located at said proximate third opening of said strainer assembly;
wherein said lower body assembly has a lower handle connected to an outer cylindrical wall thereof;
wherein said lower handle is fixedly attached at a first position on the top end of said lower body assembly in a perpendicular orientation with respect to a normal axis coincident to a plane of a surface of said outer wall; wherein the pivoting handle is pivotably attached to said lower body assembly by means of said second pivoting junction connected with said third pivoting junction by a pivoting means having a first pivoting axis;
wherein said third pivoting junction is fixedly attached at the top end of said lower body assembly at a position directly opposite said first position of said lower handle;
wherein said pivoting handle pivots about said first pivoting axis; wherein said pivoting handle can pivot 180° about said first pivoting axis from a first open position to a second closed position;
wherein said pivoting handle is brought into an approximately parallel configuration with respect to the orientation of said fixedly attached lower handle;
wherein said pusher rod pivots about said first pivoting junction having a second pivoting axis;
wherein said pusher rod and attached pusher plate move into alignment with a center axis of said straight cylinder of said strainer assembly when said pivoting handle pivots about said first pivoting axis; and
wherein said distal end of said pusher rod is pivotably connected to said pivoting handle at said second pivoting axis located at said first pivoting junction that is a distance equivalent to one half the inner diameter of the cylinder of said lower body assembly with respect to said first pivoting axis located at said second pivoting junction so that when said pivoting handle is pivoted about said first pivoting axis, the second pivoting axis moves into alignment with said center axis of both the straight cylinder of said strainer assembly.

17. The ricer tool of claim 16, wherein at least one of said lower handle and said pivoting handle feature an ergonomic surface on a respective hand engagement side thereof; wherein said ergonomic surface is an insert attached to a hand engaging surface thereof; and wherein said insert is constructed of an ergonomic material selected from a copolymer, elastomer, latex, polymer, resin, rubber, and silicone.

18. The ricer tool of claim 17, wherein said lower body assembly features at least one thumb handle assembly.

19. The ricer tool of claim 18, wherein said thumb handle assembly is located immediately opposite said lower handle and adjacent to said pivoting handle at a position on the outer cylinder of said lower body immediately below said third pivoting junction.

20. The ricer tool of claim 19, wherein said thumb handle assembly includes an ergonomic material selected from a copolymer, elastomer, latex, polymer, resin, rubber, and silicone.

* * * * *